(12) United States Patent
Yan

(10) Patent No.: US 10,545,391 B2
(45) Date of Patent: Jan. 28, 2020

(54) DRIVING APPARATUS, GIMBAL, IMAGING DEVICE, AERIAL VEHICLE AND MOVABLE DEVICE

(71) Applicant: SZ DJI OSMO TECHNOLOGY CO., LTD., Shenzhen (CN)

(72) Inventor: Xin Yan, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/002,386

(22) Filed: Jun. 7, 2018

(65) Prior Publication Data

US 2018/0284579 A1 Oct. 4, 2018

Related U.S. Application Data

(63) Continuation of application No. PCT/CN2015/097068, filed on Dec. 10, 2015.

(51) Int. Cl.
| | |
|---|---|
| *G03B 17/56* | (2006.01) |
| *B64D 47/08* | (2006.01) |
| *F16M 11/10* | (2006.01) |
| *F16M 11/20* | (2006.01) |
| *F16M 13/02* | (2006.01) |

(Continued)

(52) U.S. Cl.
CPC ......... *G03B 17/561* (2013.01); *B64D 47/08* (2013.01); *F16M 11/10* (2013.01); *F16M 11/2071* (2013.01); *F16M 13/02* (2013.01); *B64C 39/024* (2013.01); *B64C 2201/127* (2013.01); *G03B 15/006* (2013.01)

(58) Field of Classification Search
CPC .............................. G03B 17/561; B64D 47/08
See application file for complete search history.

(56) References Cited

U.S. PATENT DOCUMENTS

| | | |
|---|---|---|
| 5,690,500 A | 11/1997 | Ishikawa et al. |
| 6,628,338 B1 | 9/2003 | Elberbaum et al. |

(Continued)

FOREIGN PATENT DOCUMENTS

| | | |
|---|---|---|
| CN | 201348712 Y | 11/2009 |
| CN | 101666898 A | 3/2010 |

(Continued)

OTHER PUBLICATIONS

The World Intellectual Property Organization (WIPO) International Search Report for PCT/CN2015/097068 Sep. 21, 2016 5 Pages (including translation).

*Primary Examiner* — Clayton E. LaBalle
*Assistant Examiner* — Dennis Hancock
(74) *Attorney, Agent, or Firm* — Anova Law Group, PLLC

(57) ABSTRACT

A gimbal includes a support, a carrying member carrying an electrical component, a carrying member driver coupled to the support and the carrying member, and a transmission member in the support. The carrying member driver is configured to drive the carrying member to rotate relative to the support. The carrying member driver includes a stator coupled to the support, and a rotor sleeving outside the stator and being coupled to the carrying member. The transmission member extends from within the support, winds around a circumference of the rotor, and extends to the carrying member to be electrically connected with the electrical component.

20 Claims, 6 Drawing Sheets

(51) Int. Cl.
 *B64C 39/02* (2006.01)
 *G03B 15/00* (2006.01)

(56) References Cited

U.S. PATENT DOCUMENTS

| | | | | |
|---|---|---|---|---|
| 2001/0055487 | A1* | 12/2001 | Akada | G03B 17/00 396/427 |
| 2007/0025711 | A1* | 2/2007 | Marcus | G03B 17/38 396/56 |
| 2010/0051774 | A1* | 3/2010 | Shi | F16M 11/10 248/349.1 |
| 2010/0066831 | A1* | 3/2010 | Origuchi | G03B 15/00 348/143 |
| 2015/0349605 | A1* | 12/2015 | Li | H02K 7/003 310/75 A |
| 2016/0023778 | A1* | 1/2016 | Zhao | B64D 47/08 396/12 |

FOREIGN PATENT DOCUMENTS

| | | |
|---|---|---|
| CN | 103213687 A | 7/2013 |
| CN | 203927268 U | 11/2014 |
| CN | 204141162 U | 2/2015 |
| CN | 204250379 U | 4/2015 |
| CN | 104781600 A | 7/2015 |
| CN | 205311922 U | 6/2016 |
| DE | 202005012784 U1 | 4/2006 |
| JP | H07265287 A | 10/1995 |
| JP | 2001145247 A | 5/2001 |
| JP | 2015092252 A | 5/2015 |
| WO | 0175326 A1 | 10/2001 |
| WO | 2013155032 A1 | 10/2013 |

\* cited by examiner

DRIVING APPARATUS, GIMBAL, IMAGING DEVICE, AERIAL VEHICLE AND MOVABLE DEVICE

CROSS-REFERENCE TO RELATED APPLICATION

This application is a continuation of International Application No. PCT/CN2015/097068, filed on Dec. 10, 2015, the entire contents of which are incorporated herein by reference.

TECHNICAL FIELD

The present disclosure relates to a driving apparatus. The present disclosure also relates to a gimbal, an imaging device, an aerial vehicle and a movable device having the driving apparatus.

BACKGROUND OF THE DISCLOSURE

An electronic apparatus such as a video camera or an image camera can be carried on an electric gimbal to perform an image capturing. The electronic apparatus can be electrically connected to electrical components of the gimbal to transmit data or electric power. The gimbal can be a two-axis gimbal or a three-axis gimbal, and the electronic apparatus can be coupled to an end shaft of the gimbal and driven by the gimbal to change an imaging attitude. A relative long electrical wire can be used in connecting the electronic apparatus with the electrical components of the gimbal to effect a sufficient rotation angle of the end shaft of the gimbal. A dedicated part for winding the wire can be provided on the gimbal to prevent the electrical wire from tangling during a rotation of the gimbal. However, the dedicated part for winding the wire can be large, thus a volume of the gimbal is increased and a compact design of the gimbal is not effected.

SUMMARY OF THE DISCLOSURE

There is a need for a gimbal having a small volume and a driving apparatus of the gimbal. There is also a need for an imaging device, an aerial vehicle and a movable device having the gimbal.

An aspect of the present disclosure discloses a gimbal, the gimbal comprising a support, a carrying member and a carrying member driver, the support and the carrying member being coupled to the carrying member driver, the carrying member driver being capable of driving a rotation of the carrying member relative to the support. The carrying member driver can comprise a stator and a rotor, the stator being coupled to the support, the rotor sleeving outside the stator and being coupled to the carrying member. The gimbal can further comprise a transmission member provided within the support. The carrying member can be provided with an electrical component. The transmission member can extend from within the support, wind around a circumference of the rotor and extend to the carrying member to be electrically connected with the electrical component.

In some embodiments, the transmission member can be a cable configured to transmit a power or data.

In some embodiments, the transmission member can be a flexible circuit board configured to transmit a power or data.

In some embodiments, the transmission member can wind around the circumference of the rotor by two turns and extend to the carrying member to be electrically connected with the electrical component.

In some embodiments, a maximum rotation of the carrying member relative to the support driven by the carrying member driver can be no more than 360 degrees.

In some embodiments, the carrying member driver can be a rotary motor, a rotary cylinder or a steering gear.

In some embodiments, the carrying member can comprise a receiving portion coupled to the support and a carrying portion coupled to the receiving portion. The rotor can be received within the receiving portion. The electrical component can be provided on the carrying portion.

In some embodiments, the support can comprise a supporting arm. The stator is fixed to an end of the supporting arm and protrudes into the receiving portion.

In some embodiments, the carrying member can comprise an assembling portion configured to detachably carry an electronic apparatus.

In some embodiments, the electronic apparatus can be connected to the assembling portion using a snap fit.

In some embodiments, the assembling portion can be provided with a holding portion. The electronic apparatus can be provided with an engaging portion which can engage with the holding portion to fix the electronic apparatus to the assembling portion.

In some embodiments, one of the holding portion and the engaging portion can be a protrusion, a buckle or a holding arm, and the other one of the holding portion and the engaging portion can be an engaging groove or a bayonet.

In some embodiments, the electronic apparatus can be connected to the assembling portion through a standard connecting member.

In some embodiments, the electronic apparatus can be connected to the assembling portion through a threaded connection structure.

In some embodiments, the assembling portion can be provided with a connecting hole allowing the electronic apparatus to be connected to the assembling portion through a threaded fastener.

In some embodiments, the assembling portion can be provided with a plurality of the connecting holes, the plurality of the connecting holes being spaced apart from each other to position and fix the electronic apparatus.

In some embodiments, the assembling portion can be a frame structure to fix the electronic apparatus.

In some embodiments, the assembling portion can comprise a bottom wall, the bottom wall being disposed on the carrying member to connect with the electronic apparatus.

In some embodiments, the assembling portion can further comprise a side wall, the side wall being disposed on the carrying member and connected with the bottom wall to connect with the electronic apparatus.

In some embodiments, the assembling portion can further comprise a top wall, the top wall being disposed on the carrying member and being opposite to the bottom wall.

In some embodiments, the bottom wall, the side wall and the top wall can be connected to one another, such that the assembling portion can be provided as a frame to receive at least a part of the electronic apparatus.

In some embodiments, the assembling portion can be provided with a first fitting portion fitted with the electronic apparatus to position the electronic apparatus.

In some embodiments, the first fitting portion can be a protrusion or a groove provided at the assembling portion.

In some embodiments, the carrying member can be provided with a connecting hole for connecting the electronic apparatus to the carrying member through a fastener.

In some embodiments, the gimbal can further comprise a connecting member and a support driver. The support driver can be coupled to the connecting member and connected with the support to drive a rotation of the support relative to the connecting member.

In some embodiments, another electrical component can be provided within the connecting member. An end of the transmission member can be connected to the other electrical component, and the other end of the transmission member can pass through the support, wind around the circumference of the rotor and extend to and be electrically connected with the electrical component provided on the carrying member.

In some embodiments, a rotating axis of the support driver can be perpendicular to a rotating axis of the carrying member driver.

In some embodiments, the connecting member can comprise a connecting arm and a connecting portion coupled to the connecting arm. The support driver can be provided within the connecting portion.

In some embodiments, the gimbal can further comprise a connecting member driver coupled to the connecting member. The connecting member driver can be connected with an external object and drive a rotation of the connecting member relative to the external object.

In some embodiments, a rotating axis of the connecting member driver can be perpendicular to the rotating axis of the support driver.

In some embodiments, the gimbal can be a three-axis gimbal. The rotating axis of the carrying member driver, the rotating axis of the support driver and the rotating axis of the connecting member driver can correspond to a pitch axis, a roll axis and a yaw axis of the three-axis gimbal, respectively.

In some embodiments, the gimbal can further comprise a receiving member coupled to the connecting arm. The connecting member driver can be provided within the receiving member and coupled to the connecting arm.

In some embodiments, the gimbal can further comprise a fitting member provided on the receiving member. The fitting member can be provided with a fitting portion by which the gimbal is connected to the external object.

In some embodiments, the fitting member can comprise a guiding surface inclined with respect to the rotating axis of the connecting member driver for slidably fitting with the external object.

In some embodiments, the gimbal can further comprise a cap member provided on the receiving member. The cap member can be provided with a positioning portion, the positioning portion fitting with the external object to position the gimbal onto the external object.

In some embodiments, the positioning portion can be an elastic pillar elastically provided on the cap member, the elastic pillar being retracted into the cap member under an external force and restoring to protrude out an outer surface of the cap member once the external force is removed.

In some embodiments, the cap member can be provided with a through hole through which data cable and/or a power cable passes. The receiving portion can be in communication with an outside environment through the through hole.

In some embodiments, an electronic apparatus can be carried by the carrier member. The electrical component electrical component can be a control circuit board to be electrically connected with the electronic apparatus.

In some embodiments, the electronic apparatus can be a video camera, an image camera or a portable communication apparatus;

or, the electronic apparatus can be an infrared camera.

In some embodiments, the electrical component can be provided with a connecting terminal to be fitted and connected with a connector provided on the electronic apparatus, such that the control circuit board can be electrically connected with the electronic apparatus.

In some embodiments, the connector can be a camera dedicated connector. The connecting terminal can be a connecting terminal adapted to the connector.

Another aspect of the present disclosure discloses an imaging device, the imaging device comprising a gimbal and an image capturing apparatus carried on the gimbal, the gimbal comprising a support, a carrying member and a carrying member driver, the support and the carrying member being coupled to the carrying member driver, the carrying member driver being capable of driving a rotation of the carrying member relative to the support. The carrying member driver can comprise a stator and a rotor, the stator being coupled to the support, the rotor sleeving outside the stator and being coupled to the carrying member. The gimbal can further comprise a transmission member provided within the support. The image capturing apparatus can be coupled to the carrying member. The transmission member can extend from within the support, wind around a circumference of the rotor and extend to the carrying member to be electrically connected with the image capturing apparatus.

In some embodiments, the transmission member can be a cable configured to transmit a power or data.

In some embodiments, the transmission member can be a flexible circuit board configured to transmit a power or data.

In some embodiments, the transmission member can wind around the circumference of the rotor by two turns and extend to the carrying member to be electrically connected with the electrical component.

In some embodiments, a maximum rotation of the carrying member relative to the support driven by the carrying member driver can be no more than 360 degrees.

In some embodiments, the carrying member driver can be a rotary motor, a rotary cylinder or a steering gear.

In some embodiments, the carrying member can comprise a receiving portion coupled to the support and a carrying portion coupled to the receiving portion. The rotor can be received within the receiving portion. The electrical component can be provided on the carrying portion.

In some embodiments, the support can comprise a supporting arm. The stator can be fixed to an end of the supporting arm and protrude into the receiving portion.

In some embodiments, the carrying member can comprise an assembling portion configured to detachably carry the image capturing apparatus.

In some embodiments, the image capturing apparatus can be connected to the assembling portion using a snap fit.

In some embodiments, the assembling portion can be provided with a holding portion. The image capturing apparatus can be provided with an engaging portion which engages with the holding portion to fix the image capturing apparatus to the assembling portion.

In some embodiments, one of the holding portion and the engaging portion can be a protrusion, a buckle or a holding arm, and the other one of the holding portion and the engaging portion can be an engaging groove or a bayonet.

In some embodiments, the image capturing apparatus can be connected to the assembling portion through a standard connecting member.

In some embodiments, the image capturing apparatus can be connected to the assembling portion through a threaded connection structure.

In some embodiments, the assembling portion can be provided with a connecting hole allowing the image capturing apparatus to be connected to the assembling portion through a threaded fastener.

In some embodiments, the assembling portion can be provided with a plurality of the connecting holes, the plurality of the connecting holes being spaced apart from each other to position and fix the image capturing apparatus.

In some embodiments, the assembling portion can be a frame structure to fix the image capturing apparatus.

In some embodiments, the assembling portion can comprise a bottom wall, the bottom wall being disposed on the carrying member to connect with the image capturing apparatus.

In some embodiments, the assembling portion can further comprise a side wall, the side wall being disposed on the carrying member and connected with the bottom wall to connect with the image capturing apparatus.

In some embodiments, the assembling portion can further comprise a top wall, the top wall being disposed on the carrying member and being opposite to the bottom wall.

In some embodiments, the bottom wall, the side wall and the top wall can be connected to one another, such that the assembling portion can be provided as a frame to receive at least a part of the image capturing apparatus.

In some embodiments, the assembling portion can be provided with a first fitting portion. The image capturing apparatus can be provided with a second fitting portion. The first fitting portion can be fitted with the second fitting portion to position the image capturing apparatus on the gimbal.

In some embodiments, one of the first fitting portion and the second fitting portion can be a protrusion provided on the assembling portion, and the other one of the first fitting portion and the second fitting portion can be a groove.

In some embodiments, the carrying member can be provided with a connecting hole for connecting the image capturing apparatus to the carrying member through a fastener.

In some embodiments, the gimbal can further comprise a connecting member and a support driver. The support driver can be coupled to the connecting member and connected with the support to drive a rotation of the support relative to the connecting member.

In some embodiments, another electrical component can be provided within the connecting member. An end of the transmission member can be connected to the other electrical component, and the other end of the transmission member can pass through the support, wind around the circumference of the rotor and extend to and be electrically connected with an electrical component provided on the carrying member.

In some embodiments, a rotating axis of the support driver can be perpendicular to a rotating axis of the carrying member driver.

In some embodiments, the connecting member can comprise a connecting arm and a connecting portion coupled to the connecting arm. The support driver can be provided within the connecting portion.

In some embodiments, the gimbal can further comprise a connecting member driver coupled to the connecting member. The connecting member driver can be connected with an external object and drive a rotation of the connecting member relative to the external object.

In some embodiments, a rotating axis of the connecting member driver can be perpendicular to the rotating axis of the support driver.

In some embodiments, the gimbal can be a three-axis gimbal. The rotating axis of the carrying member driver, the rotating axis of the support driver and the rotating axis of the connecting member driver can correspond to a pitch axis, a roll axis and a yaw axis of the three-axis gimbal, respectively.

In some embodiments, the gimbal can further comprise a receiving member coupled to the connecting arm. The connecting member driver can be provided within the receiving member and coupled to the connecting arm.

In some embodiments, the gimbal can further comprise a fitting member provided on the receiving member. The fitting member can be provided with a fitting portion by which the gimbal is connected to the external object.

In some embodiments, the fitting member can comprise a guiding surface inclined with respect to the rotating axis of the connecting member driver for slidably fitting with the external object.

In some embodiments, the gimbal can further comprise a cap member provided on the receiving member. The cap member can be provided with a positioning portion, the positioning portion fitting with the external object to position the gimbal onto the external object.

In some embodiments, the positioning portion can be an elastic pillar elastically provided on the cap member, the elastic pillar being retracted into the cap member under an external force and restoring to protrude out an outer surface of the cap member once the external force is removed.

In some embodiments, the cap member can be provided with a through hole through which data cable and/or a power cable passes. The receiving portion can be in communication with an outside environment through the through hole.

In some embodiments, the image capturing apparatus can be carried by the carrying member. The electrical component can be a control circuit board to be electrically connected with the image capturing apparatus.

In some embodiments, the image capturing apparatus can be a video camera, an image camera or a portable communication apparatus;

or, the image capturing apparatus can be an infrared camera.

In some embodiments, the electrical component can be provided with a connecting terminal to be fitted and connected with a connector provided on the image capturing apparatus, such that the control circuit board can be electrically connected with the image capturing apparatus.

In some embodiments, the connector can be a camera dedicated connector. The connecting terminal can be a connecting terminal adapted to the connector.

Another aspect of the disclosure discloses an aerial vehicle, the aerial vehicle comprising a vehicle body, a gimbal coupled to the vehicle body and an image capturing apparatus carried on the gimbal, the gimbal comprising a support, a carrying member and a carrying member driver, the support and the carrying member being coupled to the carrying member driver, the carrying member driver being capable of driving a rotation of the carrying member relative to the support. The carrying member driver can comprise a stator and a rotor, the stator being coupled to the support, the rotor sleeving outside the stator and being coupled to the carrying member. The gimbal can further comprise a transmission member provided within the support. The image capturing apparatus can be coupled to the carrying member. The transmission member can extend from within the support, wind around a circumference of the rotor and extend to the carrying member to be electrically connected with the image capturing apparatus.

In some embodiments, the transmission member can be a cable configured to transmit a power or data.

In some embodiments, the transmission member can be a flexible circuit board configured to transmit a power or data.

In some embodiments, the transmission member can wind around the circumference of the rotor by two turns and extend to the carrying member to be electrically connected with the electrical component.

In some embodiments, a maximum rotation of the carrying member relative to the support driven by the carrying member driver can be no more than 360 degrees.

In some embodiments, the carrying member driver can be a rotary motor, a rotary cylinder or a steering gear.

In some embodiments, the carrying member can comprise a receiving portion coupled to the support and a carrying portion coupled to the receiving portion. The rotor can be received within the receiving portion. The electrical component can be provided on the carrying portion.

In some embodiments, the support can comprise a supporting arm. The stator can be fixed to an end of the supporting arm and protrude into the receiving portion.

In some embodiments, the carrying member can comprise an assembling portion configured to detachably carry the image capturing apparatus.

In some embodiments, the image capturing apparatus can be connected to the assembling portion using a snap fit.

In some embodiments, the assembling portion can be provided with a holding portion. The image capturing apparatus can be provided with an engaging portion which engages with the holding portion to fix the image capturing apparatus to the assembling portion.

In some embodiments, one of the holding portion and the engaging portion can be a protrusion, a buckle or a holding arm, and the other one of the holding portion and the engaging portion can be an engaging groove or a bayonet.

In some embodiments, the image capturing apparatus can be connected to the assembling portion through a standard connecting member.

In some embodiments, the image capturing apparatus can be connected to the assembling portion through a threaded connection structure.

In some embodiments, the assembling portion can be provided with a connecting hole allowing the image capturing apparatus to be connected to the assembling portion through a threaded fastener.

In some embodiments, the assembling portion can be provided with a plurality of the connecting holes, the plurality of the connecting holes being spaced apart from each other to position and fix the image capturing apparatus.

In some embodiments, the assembling portion can be a frame structure to fix the image capturing apparatus.

In some embodiments, the assembling portion can comprise a bottom wall, the bottom wall being disposed on the carrying member to connect with the image capturing apparatus.

In some embodiments, the assembling portion can further comprise a side wall, the side wall being disposed on the carrying member and connected with the bottom wall to connect with the image capturing apparatus.

In some embodiments, the assembling portion can further comprise a top wall, the top wall being disposed on the carrying member and being opposite to the bottom wall.

In some embodiments, the bottom wall, the side wall and the top wall can be connected to one another, such that the assembling portion can be provided as a frame to receive at least a part of the image capturing apparatus.

In some embodiments, the assembling portion can be provided with a first fitting portion. The image capturing apparatus can be provided with a second fitting portion. The first fitting portion can be fitted with the second fitting portion to position the image capturing apparatus on the gimbal.

In some embodiments, one of the first fitting portion and the second fitting portion can be a protrusion provided on the assembling portion, and the other one of the first fitting portion and the second fitting portion can be a groove.

In some embodiments, the carrying member can be provided with a connecting hole for connecting the image capturing apparatus to the carrying member through a fastener.

In some embodiments, the gimbal can further comprise a connecting member and a support driver. The support driver can be coupled to the connecting member and connected with the support to drive a rotation of the support relative to the connecting member.

In some embodiments, another electrical component can be provided within the connecting member. An end of the transmission member can be connected to the other electrical component, and the other end of the transmission member can pass through the support, wind around the circumference of the rotor and extend to and be electrically connected with an electrical component provided on the carrying member.

In some embodiments, a rotating axis of the support driver can be perpendicular to a rotating axis of the carrying member driver.

In some embodiments, the connecting member can comprise a connecting arm and a connecting portion coupled to the connecting arm. The support driver can be provided within the connecting portion.

In some embodiments, the gimbal can further comprise a connecting member driver coupled to the connecting member. The connecting member driver can be connected with an external object and drive a rotation of the connecting member relative to the external object.

In some embodiments, a rotating axis of the connecting member driver can be perpendicular to the rotating axis of the support driver.

In some embodiments, the gimbal can be a three-axis gimbal. The rotating axis of the carrying member driver, the rotating axis of the support driver and the rotating axis of the connecting member driver can correspond to a pitch axis, a roll axis and a yaw axis of the three-axis gimbal, respectively.

In some embodiments, the gimbal can further comprise a receiving member coupled to the connecting arm. The connecting member driver can be provided within the receiving member and coupled to the connecting arm.

In some embodiments, the gimbal can further comprise a fitting member provided on the receiving member. The fitting member can be provided with a fitting portion by which the gimbal is connected to the external object.

In some embodiments, the fitting member can comprise a guiding surface inclined with respect to the rotating axis of the connecting member driver for slidably fitting with the external object.

In some embodiments, the gimbal can further comprise a cap member provided on the receiving member. The cap member can be provided with a positioning portion, the positioning portion fitting with the external object to position the gimbal onto the external object.

In some embodiments, the positioning portion can be an elastic pillar elastically provided on the cap member, the elastic pillar being retracted into the cap member under an external force and restoring to protrude out an outer surface of the cap member once the external force is removed.

In some embodiments, the cap member can be provided with a through hole through which data cable and/or a power cable passes. The receiving portion can be in communication with an outside environment through the through hole.

In some embodiments, the image capturing apparatus can be carried by the carrying member. The electrical component can be a control circuit board to be electrically connected with the image capturing apparatus.

In some embodiments, the image capturing apparatus can be a video camera, an image camera or a portable communication apparatus;

or, the image capturing apparatus can be an infrared camera.

In some embodiments, the electrical component can be provided with a connecting terminal to be fitted and connected with a connector provided on the image capturing apparatus, such that the control circuit board can be electrically connected with the image capturing apparatus.

In some embodiments, the connector can be a camera dedicated connector. The connecting terminal can be a connecting terminal adapted to the connector.

Another aspect of the disclosure discloses a driving apparatus, the driving apparatus comprising a support, a carrying member and a carrying member driver, the support and the carrying member being coupled to the carrying member driver, the carrying member driver being capable of driving a rotation of the carrying member relative to the support. The carrying member driver can comprise a stator and a rotor, the stator being coupled to the support, the rotor sleeving outside the stator and being coupled to the carrying member. The driving apparatus can further comprise a transmission member provided within the support. The carrying member can be provided with an electrical component. The transmission member can extend from within the support, wind around a circumference of the rotor and extend to the carrying member to be electrically connected with the electrical component.

In some embodiments, the transmission member can be a cable configured to transmit a power or data.

In some embodiments, the transmission member can be a flexible circuit board configured to transmit a power or data.

In some embodiments, the transmission member can wind around the circumference of the rotor by two turns and extend to the carrying member to be electrically connected with the electrical component.

In some embodiments, a maximum rotation of the carrying member relative to the support driven by the carrying member driver can be no more than 360 degrees.

In some embodiments, the carrying member driver can be a rotary motor, a rotary cylinder or a steering gear.

Another aspect of the disclosure discloses a movable device, the movable device comprising a gimbal and an image capturing apparatus carried on the gimbal, the gimbal comprising a support, a carrying member and a carrying member driver, the support and the carrying member being coupled to the carrying member driver, the carrying member driver being capable of driving a rotation of the carrying member relative to the support. The carrying member driver can comprise a stator and a rotor, the stator being coupled to the support, the rotor sleeving outside the stator and being coupled to the carrying member. The gimbal can further comprise a transmission member provided within the support. The image capturing apparatus can be coupled to the carrying member. The transmission member can extend from within the support, wind around a circumference of the rotor and extend to the carrying member to be electrically connected with the image capturing apparatus.

In some embodiments, the transmission member can be a cable configured to transmit a power or data.

In some embodiments, the transmission member can be a flexible circuit board configured to transmit a power or data.

In some embodiments, the transmission member can wind around the circumference of the rotor by two turns and extend to the carrying member to be electrically connected with the electrical component.

In some embodiments, a maximum rotation of the carrying member relative to the support driven by the carrying member driver can be no more than 360 degrees.

The transmission member of the driving mechanism, the imaging device, the gimbal, the aerial vehicle and the movable device as discussed hereinabove can be movably wound around the circumference of the rotor, and then connected to the electrical component on the carrying member, such that the transmission member can have an excess length to accommodate the variation in the relative position and/or relative distance between the support and the carrying member when the support and the carrying member are rotating. The excess length of the transmission member can be wound around the circumference of the rotor, such that a space around the circumference of the rotor can be reasonably utilized and a tangling of the transmission member can be prevented. No extra space for winding the transmission member is needed, such that an overall volume of the gimbal can be reduced.

LIST OF REFERENCE NUMERALS

TABLE 1

| | |
|---|---|
| Imaging device | 300 |
| Gimbal | 100 |
| First frame | 10 |
| Mounting assembly | 12 |
| Receiving member | 121 |
| Fitting member | 123 |
| Fitting portion | 1231 |
| Guiding surface | 1233 |
| Cap member | 125 |
| Positioning portion | 1251 |
| Through hole | 1253 |
| Connecting member | 14 |
| Coupling portion | 141 |
| Connecting arm | 143 |
| Connecting portion | 145 |
| Second frame | 30 |
| Support driver | 32 |
| Support | 34 |
| Supporting arm | 341 |

TABLE 1-continued

| | |
|---|---|
| Mounting portion | 343 |
| Third frame | 50 |
| Carrying member driver | 52 |
| Stator | 521 |
| Rotating shaft | 523 |
| Rotor | 525 |
| Carrying member | 54 |
| Receiving portion | 541 |
| Carrying portion | 543 |
| Assembling portion | 545 |
| Bottom wall | 5451 |
| Connecting hole | 5452, 5454, 5431 |
| Top wall | 5455 |
| Side wall | 5453 |
| First fitting portion | 5456 |
| Accommodating space | 547 |
| Auxiliary controller | 60 |
| Transmission member | 70 |
| Image capturing apparatus | 200 |
| Joint portion | 201 |
| Second fitting portion | 205 |
| Connector | 207 |

The present disclosure will be described in the illustrative embodiments by reference to the drawings.

DETAILED DESCRIPTION OF THE DISCLOSURE

A better understanding of the disclosure will be obtained by reference to the following detailed description that sets forth illustrative embodiments with reference to the drawings. It will be apparent that the embodiments described herein are merely provided by way of example only. Those skilled in the art can conceive various embodiments in light of those embodiments disclosed herein without inventive efforts, and all these embodiments are within the scope of the disclosure.

It is apparent that, if a component is described as "being fixed to" another component, it can be directly fixed to the other component, or an intermediate component can be provided therebetween. If a component is described as "being coupled to" another component, it can be directly coupled to the other component, or an intermediate component can be provided therebetween. If a component is described as "being disposed on" another component, it can be disposed directly on the other component, or an intermediate component can be provided therebetween. Terms such as "vertical", "horizontal", "left" and "right", as used in the disclosure, are merely illustrative.

Unless otherwise defined, technical and scientific terms, as used in the disclosure, have the same meaning as commonly understood by those skilled in the field of the disclosure. The terms as used in the disclosure are intended to illustrate the embodiments, not to limit the disclosure. The term "and/or", as used in the disclosure, comprises any and all combinations of one or more items as listed.

Illustrative embodiments of the disclosure are described with reference to the drawings. The embodiments and features can be combined with one another provided they are technically compatible.

Figure 1:
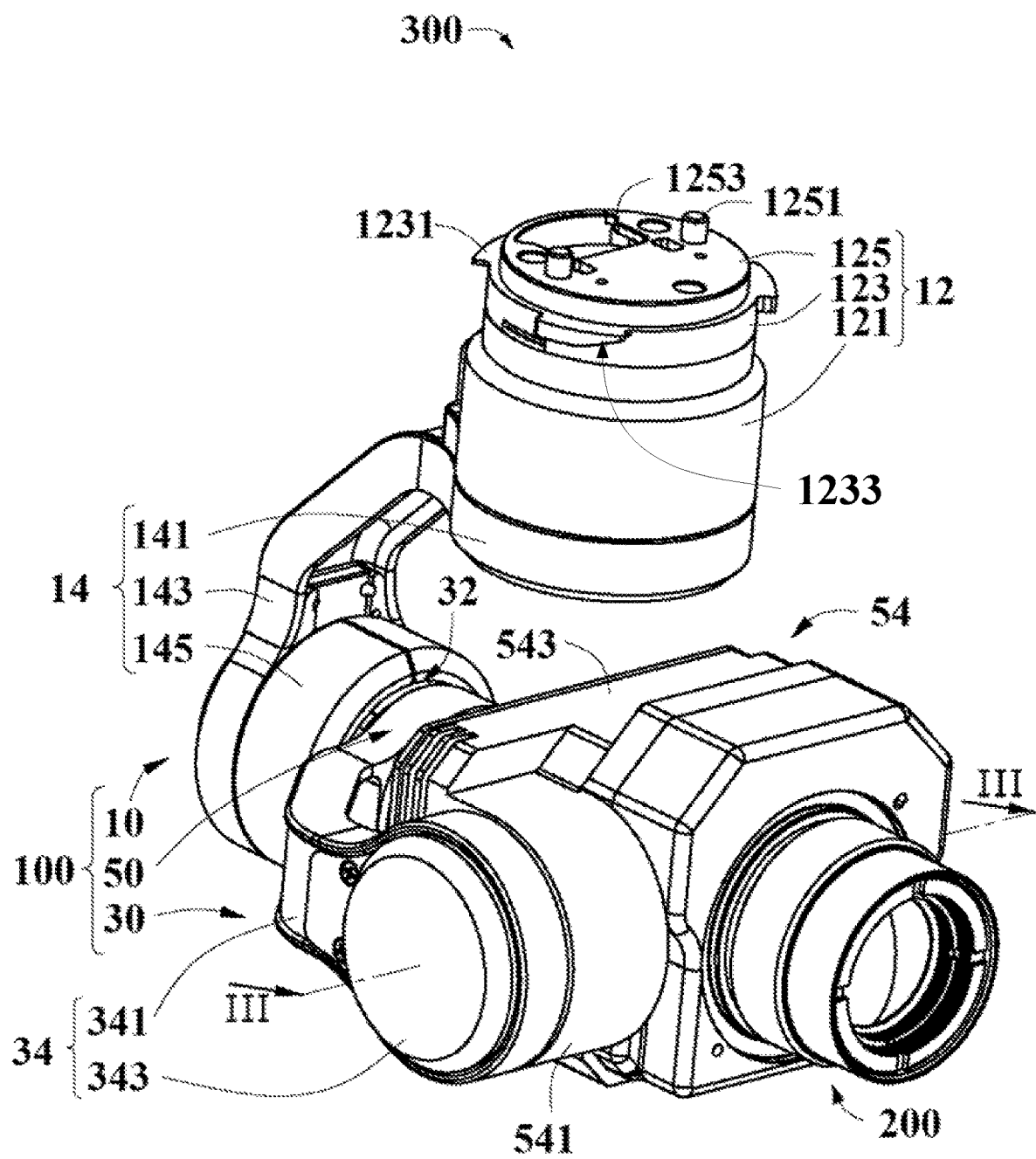
FIG. 1 shows an assembled imaging device in accordance with an embodiment of the disclosure.

Referring to FIG. 1, an embodiment of the disclosure provides an imaging device 300 for capturing images and videos. The imaging device 300 can comprise a gimbal 100 and an image capturing apparatus 200 provided on the gimbal 100. The imaging device 300 can be carried by an unmanned aerial vehicle to perform an aerial photography. The imaging device 300 can also be carried by a handle as a handheld imaging device, such that a user can manually operate the imaging device 300 to capture images and videos.

In some embodiments, the gimbal 100 can be a three-axis gimbal comprising a first frame 10, a second frame 30 and a third frame 50. The second frame 30 can be rotatably coupled to the first frame 10, and the third frame 50 can be rotatably coupled to the second frame 30.

The first frame 10 can comprise a mounting assembly 12, a connecting member 14 and a connecting member driver. In some embodiments, the connecting member 14 can be coupled to the mounting assembly 12. The connecting member driver can be provided within the mounting assembly 12 and connected with the connecting member 14. The connecting member driver can drive the connecting member 14 to rotate about a first axis.

The gimbal 100 can be coupled to a platform through mounting assembly 12. The platform can be an aerial vehicle or a handle. The mounting assembly 12 can comprise a receiving member 121, a fitting member 123 and a cap member 125. The fitting member 123 can be provided on the receiving member 121. The cap member 125 can be provided on the fitting member 123.

In some embodiments, the receiving member 121 can be provided as a substantially hollow cylinder for receive the connecting member driver (not shown).

The fitting member 123 can be provided with a substantially annular shape. The fitting member 123 can be provided at an end of the receiving member 121 and rotatable relative to the receiving member 121. The fitting member 123 can be substantially coaxial with the receiving member 121. The fitting member 123 can be connected to the platform. The fitting member 123 can be provided with a fitting portion 1231 which is fitted to a corresponding member of the platform, such that the mounting assembly 12 can be coupled to the platform. In some embodiments, four fitting portion 1231 can be provided which are evenly distributed along a circumference of the fitting member 123. Each of the fitting portions 1231 can be formed by extending from a circumference of the fitting member 123 along a radial direction of the fitting member 123.

A side of the fitting portion 1231 facing the receiving member 121 can be provided with a guiding surface 1233. The guiding surface 1233 can be inclined with respect to a rotating axis of the receiving member 121. The guiding surface 1233 can guide a motion of the mounting assembly 12 relative to the platform when coupling the mounting assembly 12 to the platform, such that the mounting assembly 12 can be accurately coupled to the platform.

The cap member 125 can be provided on an end of the fitting member 123 distal from the receiving member 121. The cap member 125 can be provided with a positioning portion 1251. The positioning portion 1251 can determine a position at which the mounting assembly 12 is coupled to the platform. In some embodiments, two positioning portions 1251 can be provided on the cap member 125 spacing from one another. Each of the positioning portions 1251 can be an elastic pillar which is elastically provided on the cap member 125. For instance, the positioning portions 1251 can be retracted into the cap member 125 under an external force, and restore to protrude out an outer surface of the cap member 125 once the external force is removed. In coupling the mounting assembly 12 to the platform, the mounting assembly 12 can be rotated along the guiding surface 1233 relative to the platform. The positioning portions 1251 can be retracted into the cap member 125 as they abut against the platform. When the mounting assembly 12 is correctly coupled to the platform, the positioning portions 1251 can be at a position corresponding to positioning holes of the platform, and restore to protrude into the positioning holes, indicating a correct coupling of the mounting assembly 12 to the platform.

The cap member 125 can be provided with a through hole 1253 penetrating the cap member 125. The cap member 125 can be in communication with an inner space of the receiving member 121, allowing an electrical component such as data cable or a power cable to pass therethrough. In some embodiments, the through hole 1253 can receive a connector, such that the gimbal 100 can be electrically connected with the platform through the connector.

The connecting member 14 can be coupled to the receiving member 121 and driven by the receiving member 121 to rotate relative to the fitting member 123. The connecting member 14 can comprise a coupling portion 141, a connecting arm 143 and a connecting portion 145. The coupling portion 141 and the connecting portion 145 can be coupled to opposite ends of the connecting arm 143.

The coupling portion 141 can be rotatably provided at an end of the receiving member 121 distal to the cap member 125. In some embodiments, the connecting arm 143 can be a substantially curved arm, an end of which can be coupled to the coupling portion 141, and the other end can extend in a direction away from the receiving member 121. The connecting portion 145 can be coupled to an end of the connecting arm 143 distal to the coupling portion 141 for connecting the second frame 30.

The connecting member driver can be provided within the receiving member 121 and connected to the coupling portion 141. The connecting member driver can drive the receiving member 121 and the connecting member 14 to rotate about the first axis relative to the fitting member 123. The first axis can be substantially parallel to an axis of the receiving member 121. The connecting member driver can be a motor of any suitable type, such as a brushless motor or a brush motor. In some embodiments, the connecting member driver can be a brushless motor, serving as a driving member in a yaw direction of the gimbal 100 to drive the rotation of the connecting member 14 about the first axis. In this case, the first axis can be a yaw axis of the gimbal 100. It will be appreciated that, the connecting member driver can serve as a driving member in a roll direction or a driving member in a pitch direction of the gimbal 100 to drive the rotation of the connecting member 14 about the first axis. In these cases, the first axis can be a roll axis or a pitch axis of the gimbal 100.

In some instances, electrical components such as a controller, an electronic speed control (ESC) unit or other electrical components, which are electrically connected with the connecting member driver, can be provided in the receiving member 121 to regulate a rotating speed and a rotating direction of the connecting member driver.

The second frame 30 comprising a support 34 and a support driver 32 can be rotatably coupled to the connecting member 14. The support driver 32 can be provided within the connecting portion 145. The support 34 can be connected to a driving end of the support driver 32.

The support driver 32 can drive the support 34 to rotate about a second axis relative to the connecting member 14. The second axis can be substantially perpendicular to the first axis. The support driver 32 can be a motor of any suitable type, such as a brushless motor or a brush motor. In some embodiments, the support driver 32 can be a brushless motor, serving as a driving member in a roll direction of the gimbal 100 to drive the connecting member 14 to rotate about the second axis. In this case, the second axis can be a roll axis of the gimbal 100. It will be appreciated that, the support driver 32 can serve as a driving member in a yaw direction or a driving member in a pitch direction of the gimbal 100 to drive the rotation of the support 34 about the second axis. In these cases, the second axis can be a yaw axis or a pitch axis of the gimbal 100.

In some instances, electrical components such as a controller, an ESC unit or other components elements, which are electrically connected with the support driver 32 can be provided in the connecting portion 145 to regulate a rotating speed and a rotating direction of the support driver 32. Optionally, the support driver 32 can be electrically connected with the electrical components within the receiving member 121, such that the electrical components within the receiving member 121 can regulate the rotating speed and the rotating direction of the support driver 32.

The support 34 can be rotatably coupled to the connecting portion 145 and can be connected to the support driver 32. In some embodiments, a structure of the support 34 can be substantially identical to that of the connecting member 14. The support 34 can comprise a supporting arm 341 and a mounting portion 343 coupled to the supporting arm 341.

In some embodiments, the supporting arm 341 can be a substantially curved arm, an end of which can be coupled to the driving end of the support driver 32, and the other end can extend in a direction away from the connecting portion 145. The mounting portion 343 can be coupled to an end of the supporting arm 341 distal to the connecting portion 145 for connecting the third frame 50.

The third frame 50 can be rotatably provided on the mounting portion 343 for carrying the image capturing apparatus 200. The third frame 50 can comprise a carrying member 54 and a carrying member driver 52. The carrying member driver 52 can be coupled to the supporting arm 341, and the carrying member 54 can be coupled to the carrying member driver 52.

The carrying member driver 52 can drive the carrying member 54 to rotate about a third axis relative to the support 34. The third axis can be substantially perpendicular to the second axis. The carrying member driver 52 can be a motor of any suitable type, such as a brushless motor or a brush motor. In some embodiments, the carrying member driver 52 can be a brushless motor, serving as a driving member in a pitch direction of the gimbal 100 to drive the rotation the carrying member 54 about the third axis. In this case, the third axis can be a pitch axis of the gimbal 100. It will be appreciated that, the carrying member driver 52 can serve as a driving member in a yaw direction or a driving member in a roll direction of the gimbal 100 to drive the rotation of the support 34 about the third axis. In these cases, the third axis can be a yaw axis or a roll axis of the gimbal 100.

Figure 2:
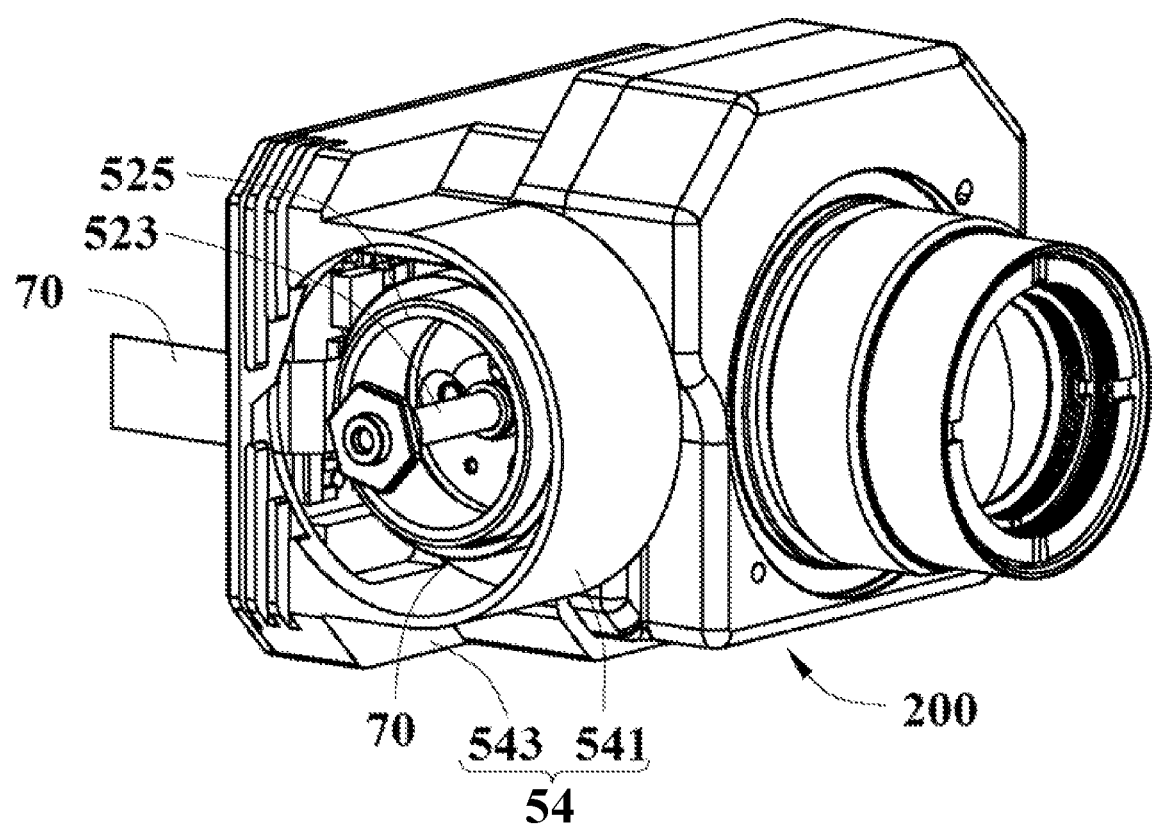
FIG. 2 shows a partial structure of the imaging device of FIG. 1.

Referring to FIG. 2, in some embodiments, the carrying member driver 52 can be an external rotor motor comprising a stator 521, a rotating shaft 523 and a rotor 525.

The stator 521 can be fixed to the mounting portion 343 and protrude to an outside of the mounting portion 343. The rotating shaft 523 can rotatably pass through the stator 521 and protrude to an outside of an end of the stator 521 distal to the mounting portion 343. The rotor 525 can be provided to sleeve outside the stator 521 and fixed to the rotating shaft 523. Once the carrying member driver 52 is powered on, the rotating shaft 523 can drive the rotor 525 to rotate relative to the stator 521.

In some instances, electrical components such as a controller, an ESC unit or other electrical components, which are electrically connected with carrying member driver 52, can be provided in the connecting portion 145 to regulate a rotating speed and a rotating direction of the carrying member driver 52. Optionally, the carrying member driver 52 can be electrically connected with the electrical a rotating within the receiving member 121, such that the electrical a rotating within the receiving member 121 can regulate the rotating speed and the rotating direction of the carrying member driver 52.

The carrying member 54 can be provided on the mounting portion 343 and coupled to the rotor 525 of the carrying member driver 52. The carrying member 54 can carry the image capturing apparatus 200. The carrying member 54 can comprise a receiving portion 541, a carrying portion 543 and an assembling portion 545. In some embodiments, the carrying portion 543 can be coupled to the receiving portion 541, and the assembling portion 545 can be coupled to the carrying portion 543.

The receiving portion 541 can cover an outside of the rotor 525. The receiving portion 541 can receive the rotor 525 therein and drive the carrying portion 543 to rotate. In some embodiments, the receiving portion 541 can be provided as a substantively cylinder which sleeve outside the rotor 525 and being fixed to the rotor 525.

The carrying portion 543 can be provided on a side of the receiving portion 541 for supporting the assembling portion 545. In some embodiments, the carrying portion 543 can be provided with a substantially plate shape. The carrying portion 543 can be provided on a side of the receiving portion 541 proximal to the connecting member 14 and extend substantially parallel to a rotating axis of the carrying member driver 52. The carrying member driver 52 can drive the carrying member 54 to rotate relative to the support 34.

Figure 4:
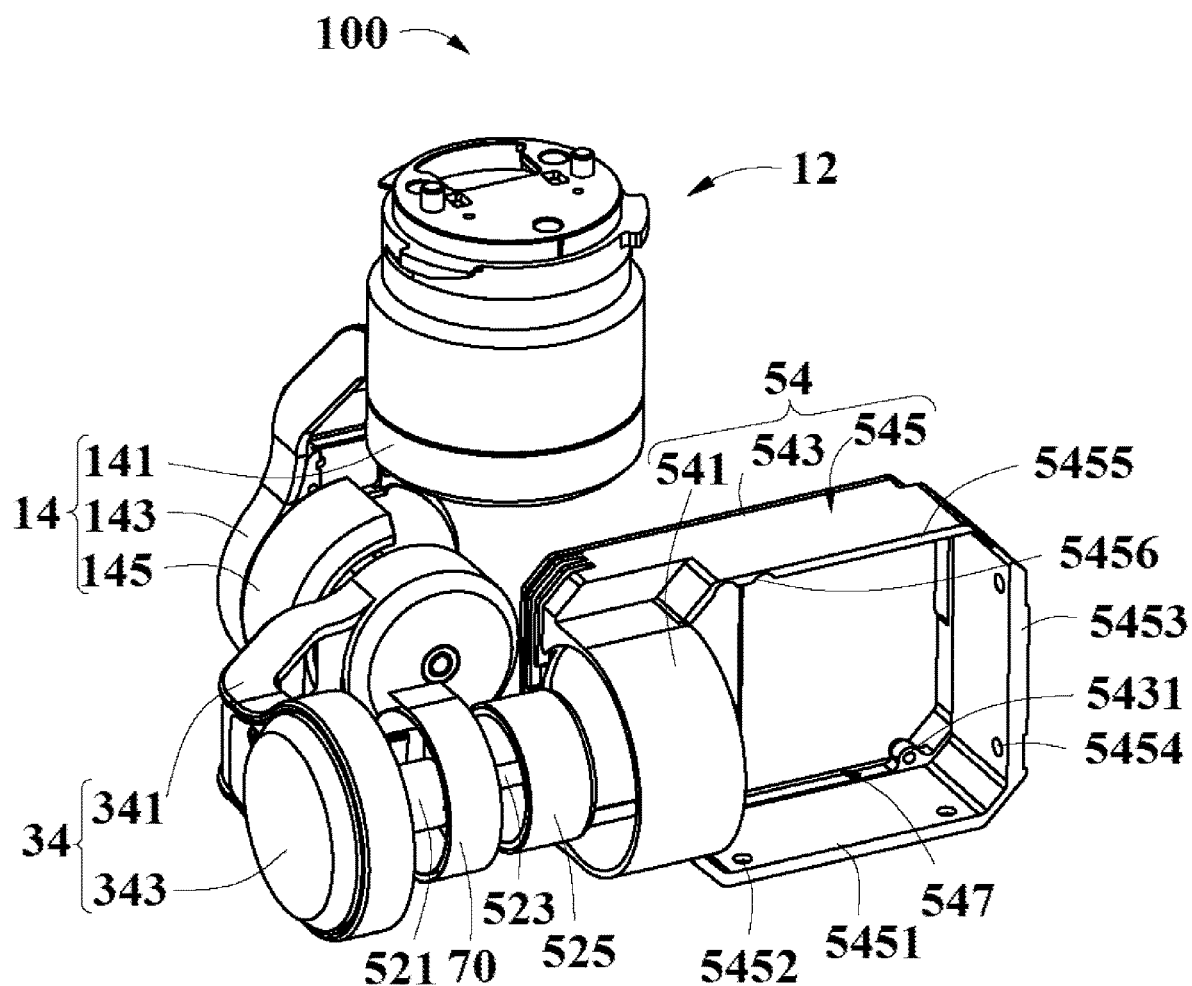
FIG. 4 shows an assembled gimbal of the imaging device of FIG. 1.
Figure 5:
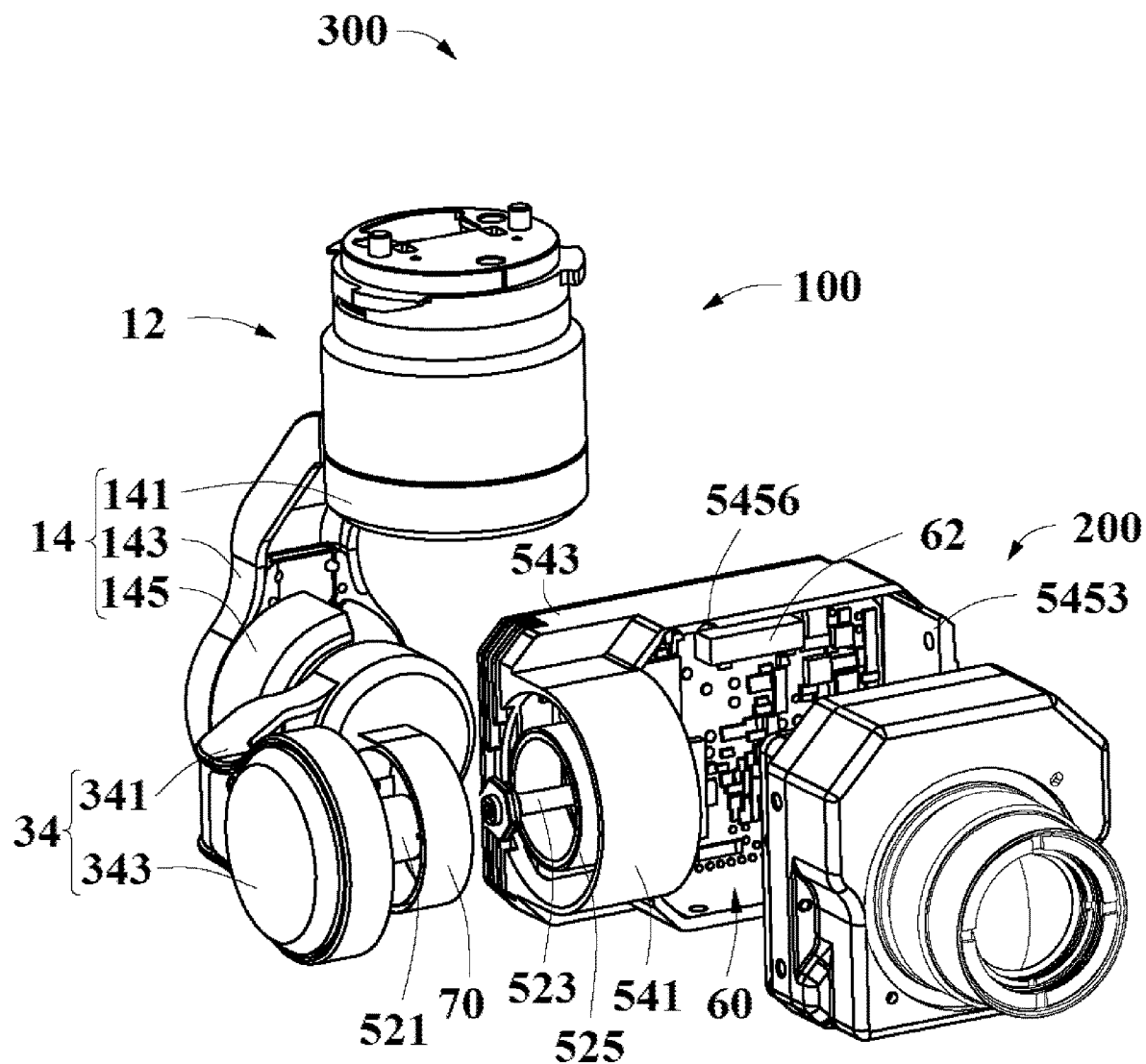
FIG. 5 is an exploded view of the imaging device of FIG. 1.
Figure 6:
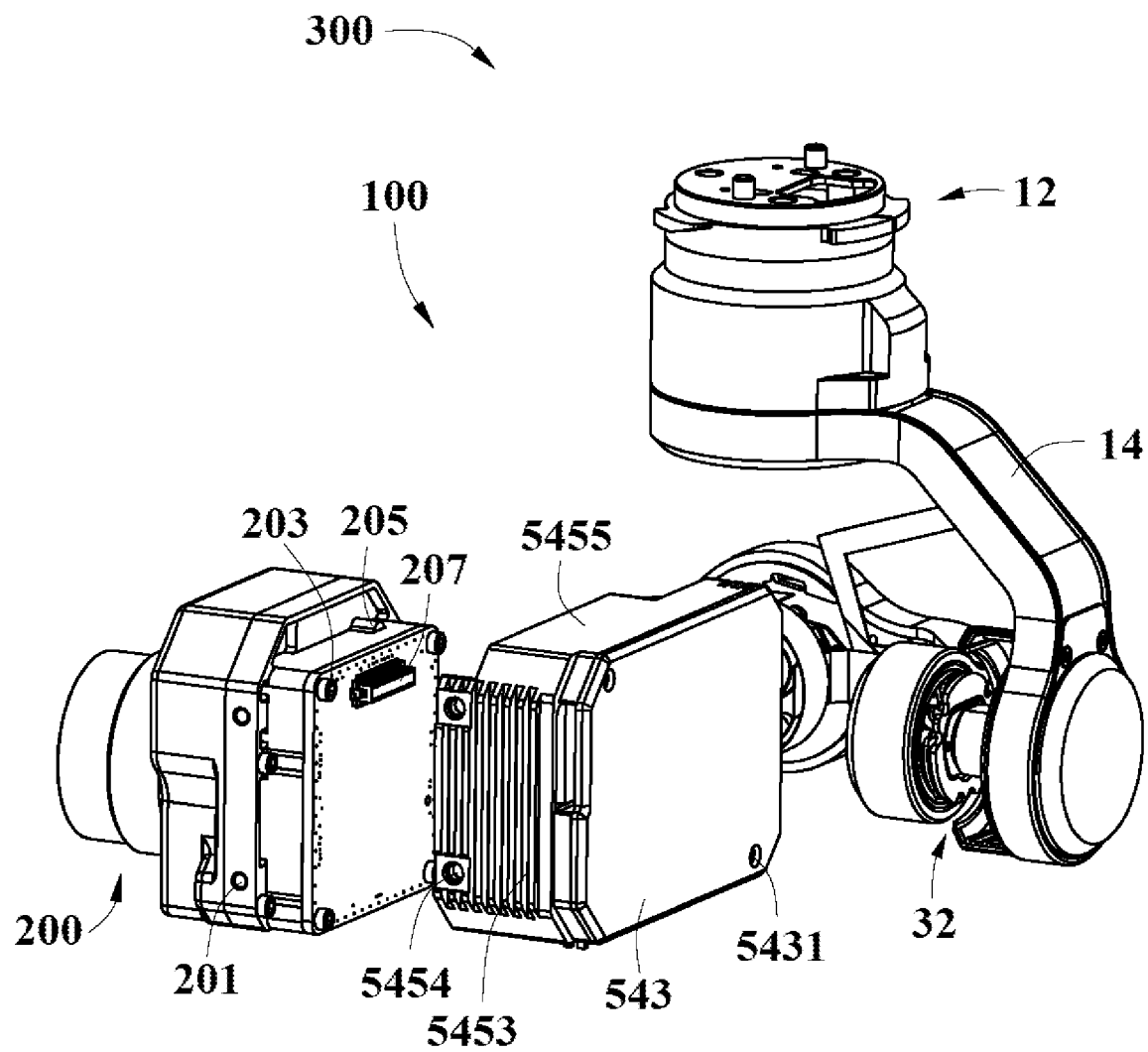
FIG. 6 is an exploded view of the imaging device of FIG. 5 from another point of view.

Referring to FIGS. 4-6, the assembling portion 545 can be provided on a side of the carrying portion 543 distal from the connecting member 14 for detachably carrying the image capturing apparatus. The assembling portion 545 can be a substantially rectangle frame comprising a bottom wall 5451, a side wall 5453 and a top wall 5455.

In the illustrated embodiments, the bottom wall 5451 can be provided on a side of the carrying portion 543 proximal to the receiving portion 541. The bottom wall 5451 can be substantially perpendicular to the carrying portion 543. An end of the bottom wall 5451 can be connected with the receiving portion 541. The side wall 5453 can be provided on a side of the carrying portion 543 distal from the receiving portion 541. The side wall 5453 can be substantially perpendicular to the carrying portion 543. The side wall 5453 can be disposed opposite to the receiving portion 541 with a spacing therebetween. An end of the side wall 5453 can be connected with the bottom wall 5451. The top wall 5455 can be provided on the other side of the carrying portion 543 proximal to the receiving portion 541. The top wall 5455 can be substantially perpendicular to the carrying portion 543. The top wall 5455 and the bottom wall 5451 can be substantially parallel and opposite to each other. Two ends of the top wall 5455 can be connected to the receiving portion 541 and the side wall 5453, respectively. In this way, the receiving portion 541, the bottom wall 5451, the side wall 5453 and the top wall 5455 can be connected to one another, thereby collectively forming an accommodating space 547 and shaping the assembling portion 545 a substantially rectangle frame to receive the electrical components of the gimbal 100. Meanwhile, the image capturing apparatus 200 can be received and fixed in the assembling portion 545.

In some instances, a connection between the assembling portion 545 and the image capturing apparatus 200 can be a quick release connection, such that the image capturing apparatus 200 can be quickly attached or detached by a standard fastener such as a screw or a bolt. Meanwhile, an overall structure of the imaging device 300 can be simplified.

In some instances, a connecting hole 5452 can be provided on the bottom wall 5451. An joint portion (not shown) can be provided on the image capturing apparatus 200 corresponding to the connecting hole 5452. The image capturing apparatus 200 can be connected to the bottom wall 5451 by a fastener such as a screw or a bolt. The fastener can pass through the connecting hole 5452 and be screwed to the joint portion to fix the image capturing apparatus 200. In some embodiments, two connecting holes 5452 can be provided on the bottom wall 5451 spacing apart from each other. It will be appreciated that, more or less connecting holes 5452 can be provided.

In some instances, a connecting hole 5454 can be provided on the side wall 5453, and an joint portion 201 can be provided on the image capturing apparatus 200 corresponding to the connecting hole 5454. The image capturing apparatus 200 can be connected to the side wall 5453 by a fastener such as a screw or a bolt. The fastener can pass through the connecting hole 5454 and be screwed to the joint portion 201 to fix the image capturing apparatus 200. In some embodiments, two connecting holes 5454 can be provided on the side wall 5453 spacing apart from each other. It will be appreciated that, more or less connecting holes 5454 can be provided.

It will be appreciated that, a connection between the assembling portion 545 and the image capturing apparatus 200 is not limited to the a connection by a standard fastener such as a screw or a bolt as discussed hereinabove. The connection can be implemented with other connection means.

For instance, the image capturing apparatus 200 can be connected with the assembling portion 545 using other types of threaded connection. For example, the threaded connection can comprise connecting members such as a nut and a stud.

For another instance, the image capturing apparatus 200 can be connected with the assembling portion 545 using a pin and a hole.

For yet another instance, the image capturing apparatus 200 can be connected to the assembling portion 545 using a snap fit. In some instances, the assembling portion 545 can be provided with a holding portion and the image capturing apparatus 200 can be provided with an engaging portion corresponding to the holding portion. The image capturing apparatus 200 can be connected with the assembling portion 545 by an engagement between the holding portion and the engaging portion. One of the holding portion and the engaging portion can be a protrusion, a buckle or a holding arm, and the other one of the holding portion and the engaging portion can be an engaging groove or a bayonet. The protrusion, the buckle or the holding arm can be engaged with the engaging groove or the bayonet, such that the image capturing apparatus 200 can be connected with the assembling portion 545. In some instances, the protrusion, the buckle or the holding arm can be an elastic member.

In some instances, the carrying portion 543 can be provided with a connecting hole 5431 for connecting the image capturing apparatus 200. The image capturing apparatus 200 can be provided with an joint portion 201 corresponding to the connecting hole 5431 to further fasten the image capturing apparatus 200.

The top wall 5455 can also be provided with a first fitting portion 5456, and the image capturing apparatus 200 can be provided with a second fitting portion 205 corresponding to the first fitting portion 5456. The second fitting portion 205 can be fitted with the first fitting portion 5456 to guide a movement of the image capturing apparatus 200 relative to the assembling portion 545 and to position the image capturing apparatus 200 on the assembling portion 545. In some embodiments, the first fitting portion 5456 can be a groove provided on a side of the top wall 5455 facing the accommodating space 547, and the second fitting portion 205 can be a protrusion to be slidably fitted with the first fitting portion 5456, such that a moving direction of the image capturing apparatus 200 relative to the assembling portion 545 can be guided and the image capturing apparatus 200 can be positioned. It will be appreciated that, the groove and the protrusion provided to the first fitting portion 5456 and the second fitting portion 205 can be interchanged. For example, the first fitting portion 5456 can be a protrusion, while the second fitting portion 205 can be a groove. It will be appreciated that, the first fitting portion 5456 can be provided at other positions. For example, the first fitting portion 5456 can be provided on one or more of the bottom wall 5451, the side wall 5453 and the top wall 5455.

The assembling portion 545 can be provided with a connecting hole with which the image capturing apparatus 200 can be connected with the assembling portion 545 by a standard fastener such as a screw. In this way, a quick release connection between the image capturing apparatus 200 and the assembling portion 545 can be effected. The image capturing apparatus 200 can be quickly attached or detached with the standard fastener. Meanwhile, an overall structure of the imaging device 300 can be simplified.

In some instances, an inner chamfer can be provided at a connection between the bottom wall 5451 and the side wall 5453, a connection between the side wall 5453 and the top wall, a connection between the top wall 5455 and the receiving portion 541 and a connection between the receiving portion 541 and the bottom wall 5451 to conform with a contour of the image capturing apparatus 200. A position of the image capturing apparatus 200 can thus be limited and a displacement of the image capturing apparatus 200 due to a vibration can be prevented. In some instances, the assembling portion 545 can be a substantially rectangle frame structure, which can limit a position of the image capturing apparatus 200 in all four directions of the frame structure, such that the displacement of the image capturing apparatus 200 due to a vibration can be further prevented.

The image capturing apparatus 200 can be detachably provided to the assembling portion 545 of the carrying member 54 for capturing images and videos. In some embodiments, the image capturing apparatus 200 can be an infrared camera for capturing infrared images or thermal images.

Figure 3:
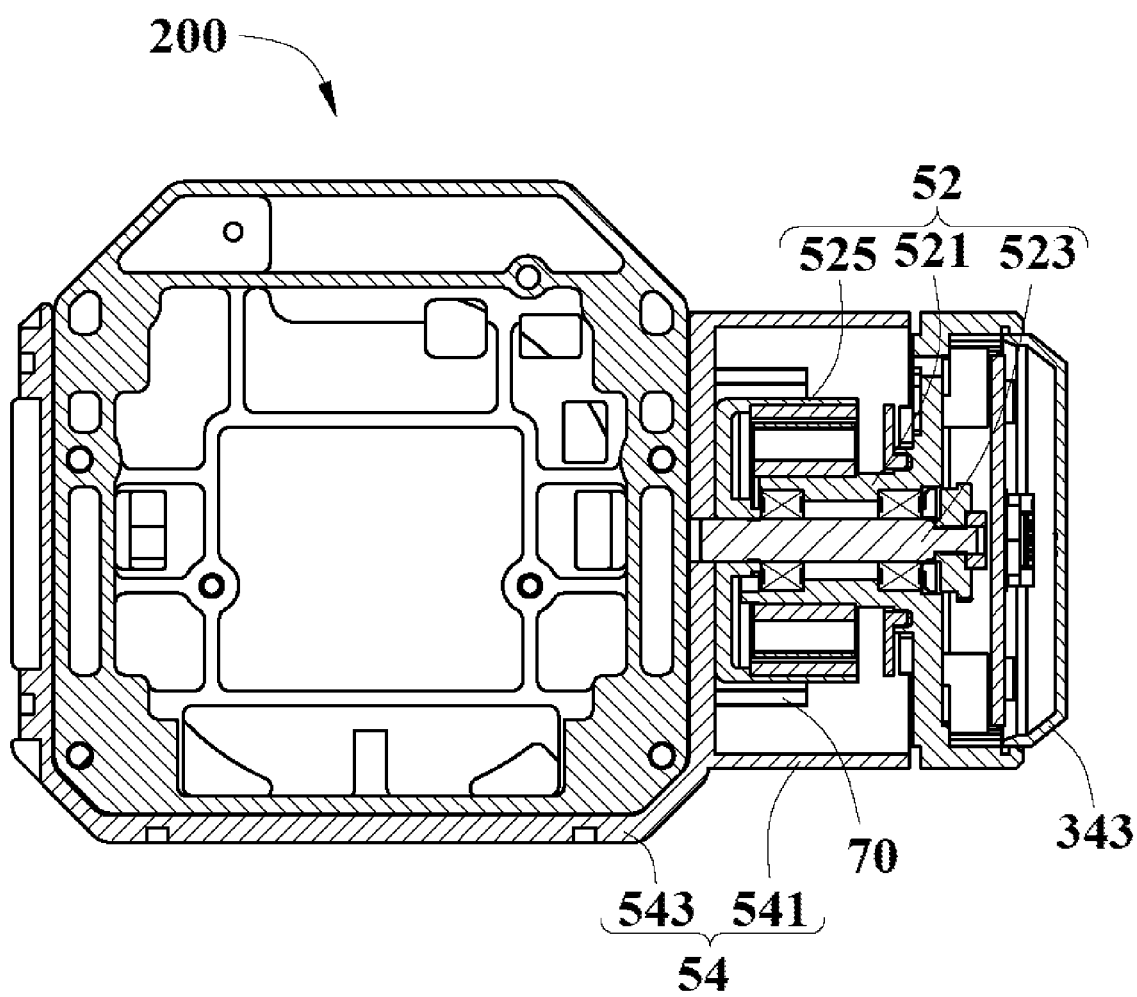
FIG. 3 is a cross-sectional view of the imaging device of FIG. 1 taken along an line.

Referring to FIG. 3, the gimbal 100 can comprise a main controller (not shown), an auxiliary controller 60 (referring to FIG. 5) and a transmission member 70 to control an imaging operation of the image capturing apparatus 200. The main controller can direct an adjustment of the gimbal 100 to a required attitude. The auxiliary controller 60 can control an operation of the image capturing apparatus 200. The auxiliary controller 60 can be electrically connected with the main controller through the transmission member 70.

In some instances, the main controller can control the connecting member driver, the support driver 32 and the carrying member driver 52 to rotate and operate in a coordinated manner, such that the image capturing apparatus 200 disposed on the carrying member 54 can be driven to a required imaging attitude. The main controller can be a controller chip or a control circuit board. In some embodiments, the main controller can be provided within the connecting member 14. It will be appreciated that, the main controller can be alternatively provided within the mounting assembly 12 or within the support 34. In some instances, the main controller can be provided on the platform of the imaging device 300.

The auxiliary controller 60 can control an imaging of the image capturing apparatus 200 and a storage and/or a transmission of images or pictures captured by the image capturing apparatus 200. The auxiliary controller 60 can be a controller chip or a control circuit board. In some embodiments, the auxiliary controller 60 can be a control circuit board. The control circuit board can be provided on the carrying portion 543 and received within the accommodating space 547. The control circuit board can be electrically connected with the image capturing apparatus 200. In some instances, the image capturing apparatus 200 can comprise a connector 207, and the auxiliary controller 60 can be provided with a connecting terminal 62. The connecting terminal 62 can be connected with the connector 207, such that the image capturing apparatus 200 can be electrically connected with the auxiliary controller 60 through the connector 207. The connector 207 can be a camera dedicated connector, and the connecting terminal 62 can be a connecting terminal adapted to the connector 207.

An end of the transmission member 70 can be connected to the main controller which is provided within the connecting member 14. The other end of the transmission member 70 can extend from the connecting member 14 into the support 34, pass through the mounting portion 343 of the support 34, and extend into the receiving portion 541 of the carrying member 54. The other end of the transmission member 70 can then be wound around a circumference of the rotor 525, and extend into the carrying portion 543 to be electrically connected with the auxiliary controller 60.

When the carrying member 54 is rotated with respect to the support 43, a relative position and/or relative distance between the main controller and the auxiliary controller 60 can be changed. The transmission member 70 can be provided with an excess length to accommodate a variation in the relative position and/or relative distance between the main controller and the auxiliary controller 60, such that a reliable electrical connection can be maintained between the main controller and the auxiliary controller 60.

In some embodiments, the transmission member 70 can be movably wound around the rotor 525 and a number of turns can be two. In this way, in a process of rotating the carrying member 54 relative to the support 34 from an initial state to an extreme angle in a first direction or in a direction opposite to the first direction, a flexibility and a freedom of in rotating the carrying member 54 is not limited by a length of the transmission member 70, the transmission member 70 is prevented from being broken by a rotation of the carrying member 54, and the transmission member 70 is prevented from tangling and winding in the receiving portion 541. In some embodiments, a maximum rotation of the carrying member 54 relative to the support 34 driven by the carrying member driver 52 can be no more than 360 degrees.

In some embodiments, the transmission member 70 can be a flexible circuit board configured to transmit images or pictures captured by the image capturing apparatus 200 from the auxiliary controller 60 to the main controller. Alternatively, the images or pictures captured by the image capturing apparatus 200 can be directly transmitted to the main controller. The main controller can transmit the images or pictures to a user through an image transmission apparatus. It will be appreciated that, the transmission member 70 can alternatively be a power cable or data cable for transmitting power or data such as control instructions.

The transmission member of the gimbal of the present disclosure can be movably wound around the circumference of the rotor, and then connected to the auxiliary controller 60. In this way, the transmission member can have an excess length to accommodate the variation in the relative position and/or relative distance between the main controller and the auxiliary controller 60. The excess length of transmission member can be wound around the circumference of the rotor, such that an internal space of the receiving portion can be reasonably utilized and a tangling of the transmission member in the receiving portion can be prevented. No extra space for winding the transmission member is needed within the receiving portion, such that an overall volume of the gimbal can be reduced, and axial lengths of the receiving portion 541 and the carrying member driver can be reduced. The gimbal can be compact, and an adjustment of a center of gravity of the gimbal can be facilitated.

The present disclosure further provides an aerial vehicle (not shown). The aerial vehicle can comprise a vehicle body and the gimbal 100 as discussed hereinabove. The gimbal 100 can be connected with the vehicle body through the fitting member 123. The aerial vehicle can carry the image capturing apparatus 200 to perform an aerial photography. The vehicle body can be provided with a receiving hole for receiving the fitting member 123. A side wall of the receiving hole can be provided with a fitting slot corresponding to the fitting portion 1231. The fitting slot can be provided with an inclined surface corresponding to the guiding surface 1233, and a bottom wall of the receiving hole can be provided with a positioning hole corresponding to the positioning portion 1251.

In connecting the gimbal 100 with the vehicle body, the fitting member 123 of the gimbal 100 can be inserted into the receiving hole and rotated therein. The guiding surface 1233 can slide on the inclined surface, and the positioning portion 1251 can be retracted into the cap member 125 as it abuts against the bottom wall of the receiving hole. The fitting member 123 can be rotated along the inclined surface until the positioning portion 1251 is at a position corresponding to the positioning hole where the positioning portion 1251 can restore and protrude into the positioning hole. In this way, the fitting portion 1231 can be engaged with the fitting slot to effect an assembling of the gimbal 100 to the vehicle body. It will be apparent that, a structure of the aerial vehicle and an operation thereof can be known in the art, therefore a detailed description is omitted in this disclosure.

It will be appreciated that, the transmission member 70 can be wound around the rotor 525 with one, two, three or more turns, such that the transmission member 70 can have an excess length to ensure a reliable electrical connection between the main controller and the auxiliary controller 60. It will be apparent that, the transmission member 70 can be tightly wound around the rotor 525 or wound on the rotor 525 in a loose and movable manner.

It will be appreciated that, the main controller can be a separate electrical component such as a controller chip, a control circuit board, or an image transmission apparatus. The main controller can be provided within the mounting assembly 12 or the support 34. In some instances, the main controller can be provided within the mounting assembly 12. In this case, an end of the transmission member 70 can be connected to the main controller, and the other end of the transmission member 70 can extend into the receiving portion 541 of the carrying member 54 along the connecting member 14 and the support 34. The other end of the transmission member 70 can then be wound around the rotor 525 and then extend into the carrying portion 543 to be electrically connected with the auxiliary controller 60.

Optionally, the main controller can be provided on the support 34. In this case, an end of the transmission member 70 can be connected to the main controller, and the other end of the transmission member 70 can extend into the receiving portion 541 of the carrying member 54 along the support 34. The other end of the transmission member 70 can be wound on the rotor 525 and then extend into the carrying portion 543 to be electrically connected with the auxiliary controller 60.

Optionally, the main controller can be provided on a platform to which the imaging device 300 is coupled. The platform can be the UAV or the handle, as discussed hereinabove. In this case, an end of the transmission member 70 can be connected to the main controller, and the other end of the transmission member 70 can pass through the through hole 1253, and then extend into the receiving portion 541 of the carrying member 54 along the mounting assembly 12, the connecting member 14 and the support 34 in this order. The other end of the transmission member 70 can then be wound on the rotor 525, and extend into the carrying portion 543 to be electrically connected with the auxiliary controller 60.

It will be appreciated that, the auxiliary controller 60 can be omitted. In this case, the main controller can be electrically connected directly with the image capturing apparatus 200 through the transmission member 70. The main controller can control an imaging of the image capturing apparatus 200, and store and/or transmit images or pictures captured by the image capturing apparatus 200.

It will be appreciated that, the image capturing apparatus, as discussed hereinabove, can be an electronic apparatus including a webcam, a video camera, an image camera or a portable communication device.

It will be appreciated that, in addition to an application on the rotatable mechanism of gimbal as discussed hereinabove, the winding structure of the transmission member, as discussed hereinabove, can be used in various driving apparatus capable of performing a relative rotation. For example, the winding structure of the transmission member as discussed hereinabove can be used in a driving apparatus of a robotic arm for driving the robotic arm to rotate.

In some instances, the driving apparatus can comprise a support, a carrying member and a carrying member driver. The carrying member driver can be coupled to the support, the carrying member can be coupled to the carrying member driver, and the carrying member driver can drive the carrying member to rotate relative to the support. The support and the carrying member can be respectively provided with a first electrical component and a second electrical component. The first electrical component can be electrically connected with the second electrical component through a transmission member. An end of the transmission member can be connected to the first electrical component, and the other end of the transmission member can be wound around a circumference of the carrying member driver. The other end of the transmission member can then extend to the carrying member and be electrically connected with the second electrical component. In this way, in a process of rotating the carrying member relative to the support from an initial state to an extreme angle in a first direction or in a direction opposite to the first direction, a flexibility and a freedom of in rotating the carrying member is not limited by a length of the transmission member, the transmission member is prevented from being broken by a rotation of the carrying member, and the transmission member is prevented from tangling and winding in the receiving portion. The transmission member can be a power cable, data cable, an optical fiber or a flexible circuit board. The carrying member driver can be a rotary motor, a rotary cylinder or a steering gear.

In embodiments of the present disclosure, the aerial vehicle can be a rotor-wing aerial vehicle for carrying an imaging apparatus such as an image camera or a video camera to perform an aerial photography. It will be appreciated that, the aerial vehicle can be used in applications including mapping, disaster investigation and rescue, surveillance, power transmission line inspection. It will be apparent that, the aerial vehicle can be a fixed-wing aerial vehicle.

It will be appreciated that, in addition to an application on the aerial vehicle, the gimbal can be used in an automatic obstacle avoidance system of various movable devices or remotely controlled movable devices such as unmanned vehicles or unmanned watercrafts.

It will be appreciated that, the platform of the gimbal is not limited to the aerial vehicle. The gimbal can be coupled to a handle, such that the imaging device can be used as a handheld imaging device.

The foregoing embodiments are intended to merely illustrate rather than limit the disclosure. While some embodiments of the disclosure have been shown and described herein, it will be obvious to those skilled in the art that such embodiments are provided by way of example only. Numerous variations and substitutions will occur to those skilled in the art without departing from the scope of the disclosure. Those variations and substitutions made in accordance with the spirit of the disclosure are within the scope of the present disclosure.

What is claimed is:

1. A gimbal comprising:
   a support;
   a carrying member carrying an electrical component;
   a carrying member driver coupled to the support and the carrying member, the carrying member driver being configured to drive the carrying member to rotate relative to the support, and the carrying member driver including:
      a stator coupled to the support;
      a rotor sleeving outside the stator and being coupled to the carrying member; and
      a rotating shaft rotatably passing through the stator and protruding to an outside of an end of the stator that is distal to the support; and
   a transmission member in the support, the transmission member extending from within the support, winding around a circumference of the rotor, and extending to the carrying member to be electrically connected with the electrical component.

2. The gimbal of claim 1, wherein the transmission member includes a flexible circuit board configured to transmit a power or data.

3. The gimbal of claim 2, wherein the transmission member winds around the circumference of the rotor by two turns and extends to the carrying member to be electrically connected with the electrical component.

4. The gimbal of claim 3, wherein a maximum rotation of the carrying member relative to the support driven by the carrying member driver is no more than 360 degrees.

5. The gimbal of claim 1, wherein the carrying member includes:
   a receiving portion having a cylindrical side wall sleeving outside the rotor, the receiving portion being fixed to the rotor and coupled to the support, the rotor being wholly received within the receiving portion, and a portion of the transmission member that is winding around the circumference of the rotor being wholly received within the receiving portion; and
   a carrying portion coupled to the side wall of the receiving portion, the electrical component being provided on the carrying portion.

6. The gimbal of claim 5, wherein the support includes a supporting arm, the stator being fixed to an end of the supporting arm and protruding into the receiving portion.

7. The gimbal of claim 1, wherein the carrying member includes an assembling portion configured to detachably carry an electronic apparatus.

8. The gimbal of claim 7, wherein the electronic apparatus is connected to the assembling portion through a standard connecting member.

9. The gimbal of claim 8, wherein the electronic apparatus is connected to the assembling portion through a threaded connection structure.

10. The gimbal of claim 9, wherein the assembling portion includes a connecting hole allowing the electronic apparatus to be connected to the assembling portion through a threaded fastener.

11. The gimbal of claim 9, wherein the assembling portion includes a plurality of connecting holes spaced apart from each other to position and fix the electronic apparatus.

12. The gimbal of claim 9, wherein the assembling portion includes a frame structure to fix the electronic apparatus.

13. The gimbal of claim 7, wherein the assembling portion includes a bottom wall disposed on the carrying member to connect with the electronic apparatus.

14. The gimbal of claim 13, wherein the assembling portion further includes a side wall disposed on the carrying member and connected with the bottom wall to connect with the electronic apparatus.

15. The gimbal of claim 14, wherein the assembling portion further includes a top wall disposed on the carrying member and being opposite to the bottom wall.

16. The gimbal of claim 15, wherein the bottom wall, the side wall, and the top wall are connected to one another to form a frame to receive at least a part of the electronic apparatus.

17. The gimbal of claim 1, further comprising:
   a connecting member; and
   a support driver coupled to the connecting member and connected with the support to drive the support to rotate relative to the connecting member.

18. The gimbal of claim 17, wherein:
   another electrical component is provided within the connecting member; and
   an end of the transmission member is connected to the other electrical component, and another end of the transmission member passes through the support, winds around the circumference of the rotor, and extends to and is electrically connected with the electrical component carried by the carrying member.

19. An imaging device comprising:
   an image capturing apparatus; and
   a gimbal carrying the image capturing apparatus, the gimbal including:

a support;

a carrying member carrying the image capturing apparatus;

a carrying member driver coupled to the support and the carrying member, the carrying member driver being configured to drive the carrying member to rotate relative to the support, and the carrying member driver including:

a stator coupled to the support;

a rotor sleeving outside the stator and being coupled to the carrying member; and a rotating shaft rotatably passing through the stator and protruding to an outside of an end of the stator that is distal to the support; and a transmission member in the support, the transmission member extending from within the support, winding around a circumference of the rotor, and extending to the carrying member to be electrically connected with the electrical component.

20. An aerial vehicle comprising:

a vehicle body;

an image capturing apparatus; and a gimbal coupled to the vehicle body and carrying the image capturing apparatus, the gimbal including:

a support;

a carrying member carrying the image capturing apparatus;

a carrying member driver coupled to the support and the carrying member, the carrying member driver being configured to drive the carrying member to rotate relative to the support, and the carrying member driver including:

a stator coupled to the support;

a rotor sleeving outside the stator and being coupled to the carrying member; and a rotating shaft rotatably passing through the stator and protruding to an outside of an end of the stator that is distal to the support; and a transmission member in the support, the transmission member extending from within the support, winding around a circumference of the rotor, and extending to the carrying member to be electrically connected with the electrical component.

\* \* \* \* \*